US009262639B2

(12) United States Patent
Mantin et al.

(10) Patent No.: US 9,262,639 B2
(45) Date of Patent: Feb. 16, 2016

(54) PLAINTEXT INJECTION ATTACK PROTECTION

(71) Applicant: Cisco Technology Inc., San Jose, CA (US)

(72) Inventors: Itsik Mantin, Shoham (IL); Eliphaz Hibshoosh, Tel Aviv (IL)

(73) Assignee: Cisco Technology Inc., San Jose, CA (US)

( * ) Notice: Subject to any disclaimer, the term of this patent is extended or adjusted under 35 U.S.C. 154(b) by 203 days.

(21) Appl. No.: 13/929,008

(22) Filed: Jun. 27, 2013

(65) Prior Publication Data

US 2014/0195816 A1    Jul. 10, 2014

(30) Foreign Application Priority Data

Jan. 9, 2013    (IL) .......................................... 224144

(51) Int. Cl.
| | |
|---|---|
| *G06F 21/00* | (2013.01) |
| *G06F 21/60* | (2013.01) |
| *G09C 1/00* | (2006.01) |
| *H04L 9/00* | (2006.01) |

(52) U.S. Cl.
CPC ............... *G06F 21/602* (2013.01); *G09C 1/00* (2013.01); *H04L 9/002* (2013.01); *H04L 2209/04* (2013.01); *H04L 2209/603* (2013.01)

(58) Field of Classification Search
CPC ... G06F 21/602; G09C 1/00; H04L 2209/603; H04L 2209/04; H04L 9/002
USPC ........................................................ 713/189
See application file for complete search history.

(56) References Cited

U.S. PATENT DOCUMENTS

| | | | | |
|---|---|---|---|---|
| 6,061,449 | A   * | 5/2000 | Candelore et al. ............... | 380/28 |
| 6,301,361 | B1 * | 10/2001 | Mischenko ........... | H04L 9/0662 |
| | | | | 380/28 |
| 6,385,727 | B1 * | 5/2002 | Cassagnol ............... | G06F 21/10 |
| | | | | 380/259 |
| 7,526,808 | B2 | 4/2009 | Lynn et al. | |
| 7,624,282 | B2 | 11/2009 | Hollar | |
| 7,721,333 | B2 | 5/2010 | Horne | |
| 8,009,826 | B2 * | 8/2011 | Barkan et al. ..................... | 380/1 |

(Continued)

OTHER PUBLICATIONS

Tan, J., et al, 'PETAL: Preset Encoding Table Information Leakage', Apr. 2013, CMU-PDL-13-106, entire document, http://www.pdl.cmu.edu/PDL-FTP/associated/CMU-PDL-13-106.pdf.*

(Continued)

*Primary Examiner* — Christopher Brown
*Assistant Examiner* — Ronald Baum
(74) *Attorney, Agent, or Firm* — Hahn Loeser & Parks, LLP

(57) ABSTRACT

A system including a memory having regions including a first and second region, the first region being different from the second region, and a digital rights management engine to receive a plurality of ciphertext cipher blocks, decrypt the ciphertext cipher blocks yielding plaintext cipher blocks, output the plaintext cipher blocks to the first region of the memory over a period of time, provide a plurality of decoy cipher blocks in addition to the plaintext cipher blocks, the decoy cipher blocks having a pattern in which: a first one of the decoy cipher blocks consists of data, and a second one of the decoy cipher blocks consists of data which is the same as the data of the first one of the decoy cipher blocks, and output the decoy cipher blocks to the second region of the memory during the period of time. Related apparatus and methods are also included.

2 Claims, 2 Drawing Sheets

(56) References Cited

U.S. PATENT DOCUMENTS

| | | | |
|---|---|---|---|
| 8,472,619 B1* | 6/2013 | Trimberger | 380/28 |
| 2002/0018565 A1* | 2/2002 | Luttrell et al. | 380/217 |
| 2003/0126458 A1* | 7/2003 | Teramoto et al. | 713/194 |
| 2003/0163718 A1* | 8/2003 | Johnson et al. | 713/193 |
| 2005/0033705 A1* | 2/2005 | Walmsley et al. | 705/67 |
| 2006/0064601 A1* | 3/2006 | Stek et al. | 713/185 |
| 2006/0155993 A1* | 7/2006 | Busboon | G06F 21/31 713/169 |
| 2007/0169191 A1 | 7/2007 | Greene et al. | |
| 2008/0005476 A1* | 1/2008 | Venkatesan et al. | 711/118 |
| 2008/0077795 A1* | 3/2008 | MacMillan | H04L 9/3228 713/169 |
| 2008/0208560 A1 | 8/2008 | Johnson et al. | |
| 2008/0216051 A1 | 9/2008 | Johnson et al. | |
| 2010/0064369 A1* | 3/2010 | Stolfo et al. | 726/24 |
| 2010/0106920 A1* | 4/2010 | Anckaert et al. | 711/154 |
| 2011/0060915 A1 | 3/2011 | Tal | |
| 2012/0278635 A1* | 11/2012 | Hars et al. | 713/193 |
| 2013/0156180 A1* | 6/2013 | Hess | 380/28 |
| 2014/0019771 A1* | 1/2014 | Emmett | H04L 9/002 713/189 |
| 2014/0052983 A1* | 2/2014 | Gold et al. | 713/160 |

OTHER PUBLICATIONS

Tech-FAQ, 'Known_Plaintext_Attack', 2015, Independent Media, entire document, http://www.idc-online.com/technical_references/pdfs/information_technology/Known_Plaintext_Attack.pdf.*

* cited by examiner

PLAINTEXT INJECTION ATTACK PROTECTION

The present application claims the benefit of the filing date of Israeli application IL 224144, filed 9 Jan. 2013.

FIELD OF THE INVENTION

The present invention relates to digital rights management engines.

BACKGROUND OF THE INVENTION

The following references are believed to represent the state of the art:

U.S. Pat. No. 7,526,808 to Lynn, et al.;
U.S. Pat. No. 7,624,282 to Hollar;
U.S. Pat. No. 7,721,333 to Horne;
US Published Patent Application 2007/0169191 of Greene, et al.;
US Published Patent Application 2008/0208560 of Johnson, et al.;
US Published Patent Application 2008/0216051 of Johnson, et al.; and
US Published Patent Application 2011/0060915 of Tal.

SUMMARY OF THE INVENTION

The present invention, in certain embodiments thereof, seeks to provide an improved digital rights management (DRM) engine system.

There is thus provided in accordance with an embodiment of the present invention, a system including a memory having a plurality of regions including a first region and a second region, the first region being different from the second region, and a digital rights management engine to receive a plurality of ciphertext cipher blocks, decrypt the ciphertext cipher blocks yielding a plurality of plaintext cipher blocks, output the plaintext cipher blocks to the first region of the memory over a period of time, provide a plurality of decoy cipher blocks in addition to the plaintext cipher blocks, the decoy cipher blocks having a pattern in which a first one of the decoy cipher blocks consists of data, and a second one of the decoy cipher blocks consists of data which is the same as the data of the first one of the decoy cipher blocks, and output the decoy cipher blocks to the second region of the memory during the period of time.

Further in accordance with an embodiment of the present invention, the memory includes a third region, the digital rights management engine being operative to output the decoy cipher blocks to the third region of the memory during the period of time, the third region being different from the second region.

Still further in accordance with an embodiment of the present invention, a third one of the decoy cipher blocks consists of data, and a fourth one of the decoy cipher blocks consists of data which is the same as the data of the third one of the decoy cipher blocks.

Additionally in accordance with an embodiment of the present invention, a size of each of the cipher blocks is between 56 and 256 bits.

There is also provided in accordance with still another embodiment of the present invention, a method including providing a memory having a plurality of regions including a first region and a second region, the first region being different from the second region, receiving a plurality of ciphertext cipher blocks, decrypting the ciphertext cipher blocks yielding a plurality of plaintext cipher blocks, outputting the plaintext cipher blocks to the first region of the memory over a period of time, providing a plurality of decoy cipher blocks in addition to the plaintext cipher blocks, the decoy cipher blocks having a pattern in which a first one of the decoy cipher blocks consists of data, and a second one of the decoy cipher blocks consists of data which is the same as the data of the first one of the decoy cipher blocks, and outputting the decoy cipher blocks to the second region of the memory during the period of time.

Moreover in accordance with an embodiment of the present invention, the memory includes a third region, the method further including outputting the decoy cipher blocks to the third region of the memory during the period of time, the third region being different from the second region.

Further in accordance with an embodiment of the present invention, a third one of the decoy cipher blocks consists of data, and a fourth one of the decoy cipher blocks consists of data which is the same as the data of the third one of the decoy cipher blocks.

Still further in accordance with an embodiment of the present invention, a size of each of the cipher blocks is between 56 and 256 bits.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
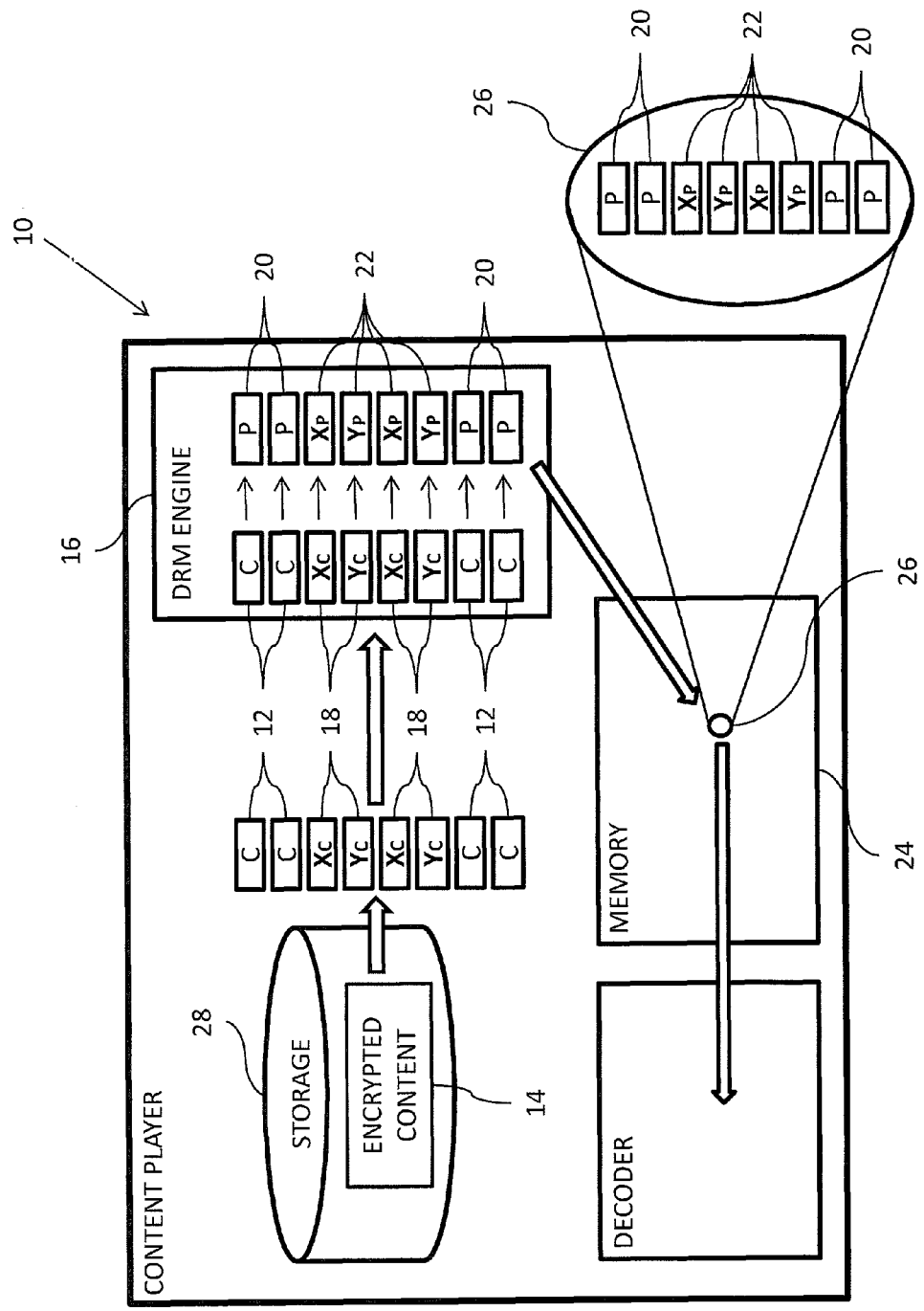
FIG. 1 is a partly pictorial, partly block diagram view of a DRM system being subject to a plaintext injection attack.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

Reference is now made to FIG. 1, which is a partly pictorial, partly block diagram view of a DRM system 10 being subject to a plaintext injection attack.

By way of introduction, DRM systems come to protect the provisioning and consumption of multimedia content, including video, music, audio-books, e-books, games, e-newspapers, by way of example only.

In many DRM systems content is decrypted in open non-trusted environments, for example, but not limited to, PCs, tablet computers, smart phones and sometimes set-top boxes (STBs) where the content may be subject to a content extraction attack by an attacker who is typically the owner of the device where the owner may run the applications with the highest privileges possible. Moreover, in many DRM systems the attacker has full control over the ciphertext data, for example, but not limited to, when the content is stored in a storage device or delivered from a content delivery server. In particular, when the ciphertext (encrypted content) and its license (DRM-protected key) is delivered in open standard file format where the association of any license to any ciphertext is easily made, the content is particularly vulnerable to attack.

In the above situation, the attacker can manipulate the ciphertext form of the content in a way that allows mounting a clear content extraction attack. Typically, key to the success of such extraction is the ability to locate the plaintext in the vast device memory in which the DRM engine disposes the plaintext blocks.

Those that are skillful in the art will appreciate that an attacker that has such ciphertext manipulation capabilities when the content encryption scheme uses a block cipher in any suitable mode of operation (e.g.: ECB, CBC, PCBC) can manipulate the ciphertext in a way that imparts a pattern or patterns in the corresponding plaintext data. It will be appreciated by one ordinarily skilled in the art that although the manipulation results in ruining the plaintext data, the manipulation makes the plaintext data more easily traceable in the device's memory as the hacker simply looks for the pattern in order to identify the location of the plaintext in the vast device memory.

The blocks of the patterns injected into the plaintext by the hacker are typically the same size as the ciphertext blocks used in the encryption scheme of the content.

An example of a plaintext injection attack is now described with reference to FIG. 1.

Ciphertext blocks 12 of an encrypted content item 14 are retrieved from a disk 28 by a DRM engine 16. A hacker inserts some additional blocks 18 with a pattern XcYcXcYc into the stream of ciphertext blocks 12. The pattern XcYcXcYc includes a block Xc and a block Yc which are each repeated in an alternate fashion.

The DRM engine 16 decrypts the ciphertext blocks 12 yielding a plurality of plaintext blocks 20. The DRM engine 16 also decrypts the additional blocks 18 with the pattern XcYcXcYc yielding a plurality of plaintext blocks 22 (XpYpXpYp).

The plaintext blocks 20 and the plaintext blocks 22 are outputted by the DRM engine 16 to a region 26 of a memory 24. The hacker then searches the memory 24 to find blocks with a repetitive pattern XpYpXpYp where blocks are repeated in an alternate fashion. One ordinarily skilled in the art will appreciated that locating the repetitive pattern in the memory 24 is relatively easy. Once the region 26 is identified by the hacker, the content can then be extracted by the hacker from the region 26 during a future decryption of the encrypted content item 14.

Plaintext injection attacks are typically an effective way to extract content in circumstances that are typical to DRM systems where the ciphertext is not cryptographically bound to its license.

Figure 2:
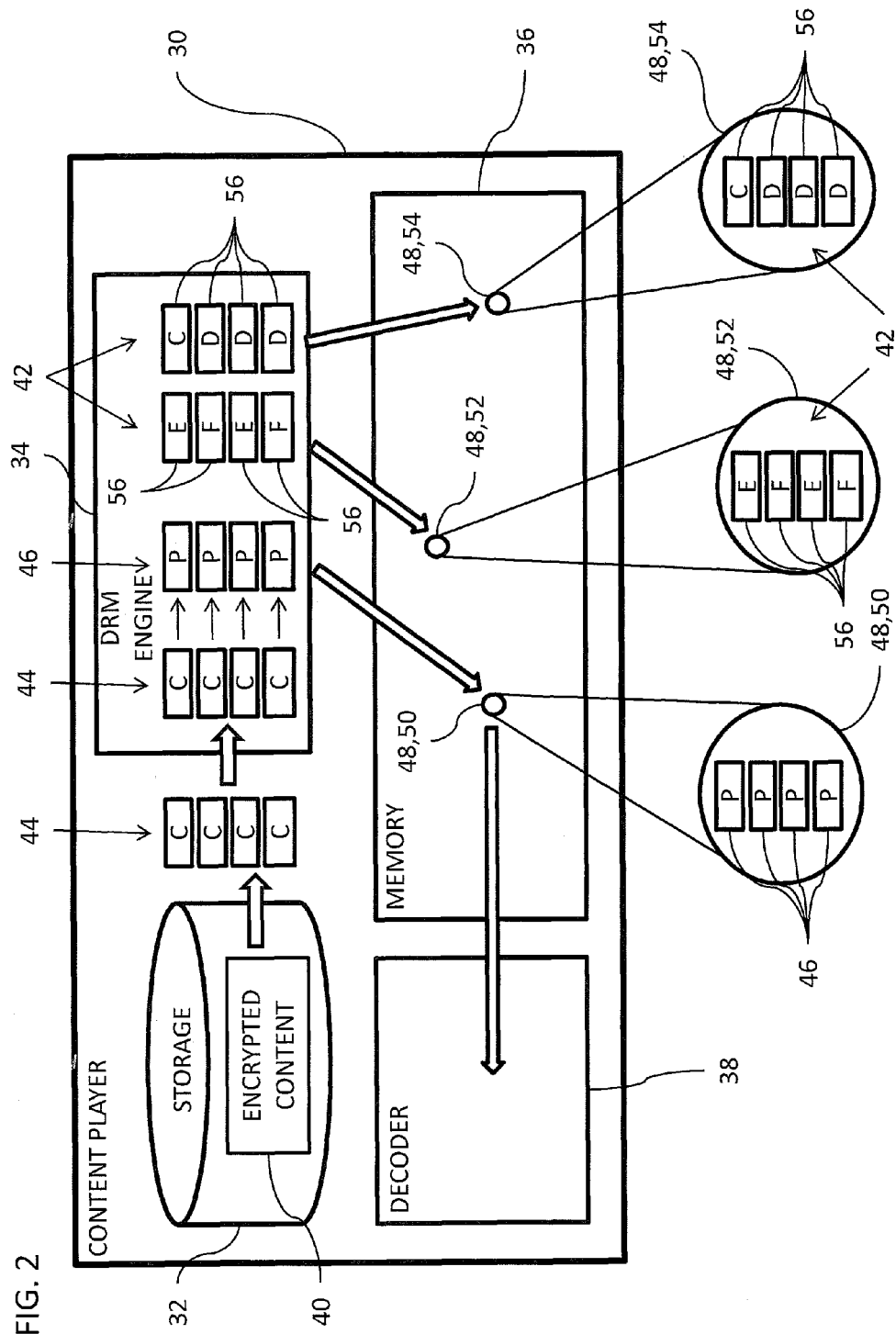
FIG. 2 is a partly pictorial, partly block diagram view of a content player constructed and operative in accordance with an embodiment of the present invention.

Reference is now made to FIG. 2, which is a partly pictorial, partly block diagram view of a content player 30 constructed and operative in accordance with an embodiment of the present invention.

The content player 30 typically includes a storage device 32, a DRM engine 34, a memory 36 and a decoder 38.

By way of introduction, the content player 30 typically provides protection against plaintext injection attacks by way of the DRM engine 34 scattering decoy cipher block patterns 42 in the memory 36 resembling plaintext injection attack (PIA) patterns while a content item 40 is being decrypted by the DRM engine 34. When an attacker mounts a PIA, the attacker will face the extremely difficult task of first distinguishing the decoy cipher block patterns 42 planted by the DRM engine 34 from the plaintext blocks 22 (FIG. 1) injected by the attack.

The description below assumes that the content decryption scheme used to decrypt the content item 40 uses a block cipher algorithm of L bytes. The cipher block size of the content decryption scheme may be between 56 and 256 bits or any suitable size, by way of example only.

The decoy cipher block patterns 42 may include any suitable decoy pattern.

The storage device 32 is typically operative to store the encrypted content item 40. Alternatively, the content item 40 may be stored in any suitable storage device which is remote to the content player 30 and streamed to the DRM engine 34 from a content server (not shown).

The memory 36 includes a plurality of different regions 48. Only three of the regions 48 are shown in FIG. 2 for the sake of clarity. The three regions are labeled region 50, region 52, and region 54 in FIG. 2.

The DRM engine 34 is typically operative to retrieve/receive the content item 40 from the storage device 32 or the remote server a section at a time. Each section of the content item 40 may include one or more ciphertext cipher blocks 44. The DRM engine 34 is typically operative to decrypt the ciphertext cipher blocks 44 yielding a plurality of plaintext cipher blocks 46 and output the plaintext cipher blocks 46 to the region 50 of the memory 36 over a period of time, t.

The DRM engine 34 is operative to provide a plurality of decoy cipher blocks 56 in addition to the plaintext cipher blocks 46. The decoy cipher blocks 56 have a pattern. FIG. 2 shows two groups of decoy cipher blocks 56, one with the pattern EFEF and one with the pattern CDDD.

The EFEF and the CDDD patterns each include at least one of the decoy cipher blocks 56 (e.g.: Cipher block D, E or F) consisting of the same data as another of the decoy cipher blocks 56 (e.g.: Cipher block D, E or F). In other words the block data of at least two of the decoy cipher blocks 56 is the same.

The EFEF pattern includes two pairs of the decoy cipher blocks 56, wherein the blocks in each pair consist of the same data, e.g. two E blocks and two F blocks. The CDDD pattern includes two of the decoy cipher blocks 56 (block C and block D) with one of the decoy cipher blocks 56 (block D) being repeated three times.

The DRM engine 34 is operative to output the decoy cipher blocks 56 to the region 52 and/or the region 54 of the memory 36 some time during the period of time, t. It should be noted that the outputting of any of the decoy cipher blocks 56 need not take place at exactly the same time that one of the plaintext cipher blocks 46 is being outputted.

In FIG. 2, the EFEF pattern is shown as being outputted to the region 52 and the CDDD pattern being outputted to the region 54.

It will be appreciated that when an attacker mounts a PIA, the attacker will face the difficult, but not impossible, task of first distinguishing the decoy cipher block patterns 42 planted by the DRM engine 34 from the plaintext blocks 22 (FIG. 1) injected by the attack as described above.

It will be appreciated that some protection will be afforded against PIA even if the decoy cipher blocks 56 are only outputted to region 52 and not to region 54. It will also be appreciated that more protection against PIA will be afforded if the decoy cipher blocks 56 are outputted to more than two regions 48 of the memory 36. It will be appreciated that the same or different patterns may be outputted to all the different regions 48 or some or all patterns may be repeated a certain number of times over different regions 48. It will be appreciated that while any decoy pattern offers some protection, the closer the decoy pattern is to the PIA pattern the protection against PIA is greater and therefore a greater variety of patterns offers greater protection against PIA.

It will be appreciated that greater protection against PIA is afforded if the decoy cipher blocks 56 are outputted to the memory 36 with greater frequency. The frequency of outputting the decoy cipher blocks 56 may depend on the available spare processing power of the DRM engine 34.

The plaintext cipher blocks 46 are typically retrieved from the region 50 of the memory 36 by a suitable rendering apparatus for example, but not limited to, the decoder 38. The decoder 38 may be replaced by any suitable content renderer for example, a video or audio renderer or a text or graphics renderer.

The following are additional examples of possible decoy patterns 42. The examples use blocks selected from block A, block C and block D. Blocks A, C, and D are arbitrary or random blocks each of L bytes.

EXAMPLE DECOY CIPHER BLOCK PATTERN 1

Each decoy cipher block pattern 42 may include repetitions of block A, for example, but not limited to, AAA . . . AAA. So in general, the pattern 42 includes r instances of block A (of L bytes) with r being a parameter that can be chosen arbitrarily or in a pseudo-random fashion. r may be any suitable value, for example, but not limited to, between 2 and 10, inclusive.

EXAMPLE DECOY CIPHER BLOCK PATTERN 2

Each decoy cipher block pattern 42 may include repetition of the pattern CDD . . . DD with a gap between the CDD . . . DD patterns that is a multiple of L bytes, for example, but not limited to, CDD . . . DD N1N2N3 Nt CDD . . . DD, where N1N2N3 Nt are random or arbitrary blocks. The two parts of the CDD . . . DD pattern may have a different number of repetitions of D. In general, the first sequence of D blocks includes s instances of D (for example between 2 and 10 instances, inclusive), the second sequence of D blocks includes r instances of D (for example, between 2 and 10 instances, inclusive) and the gap includes t instances of L bytes blocks (for example, between 1 and 10 instances, inclusive). The parameters r, s and t may be chosen in an arbitrary or pseudo-random fashion.

EXAMPLE DECOY CIPHER BLOCK PATTERN 3

Each decoy cipher block pattern 42 may include alternating sequences of block repetitions, for example, but not limited to, CDCDCDCDCDCDCD. In general, the pattern 42 includes r instances of C and D where r is between 2 and 10, inclusive.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:
1. A system comprising:
a memory having a plurality of regions;
a digital rights management engine to protect the provisioning and consumption of multimedia content associated with a license, the digital rights management engine being a trusted and distinct element from the memory, the digital rights management engine being operative to:
receive a plurality of ciphertext blocks of the multimedia content;
decrypt the ciphertext blocks yielding a plurality of plaintext blocks;
output the plaintext blocks to a first region of the memory;
provide a plurality of groups of other blocks in addition to the plaintext blocks for scattering to a plurality of different regions of the memory for storage while the ciphertext blocks of the multimedia content are being decrypted to provide protection against a plaintext injection attack, the plurality of different regions of the memory being distinct from the first region of the memory, each of the groups of other blocks having a predetermined pattern including at least three blocks, wherein at least two of the at least three blocks consist of the same data and wherein a size of each of the ciphertext, plaintext and other blocks is between 56 and 256 bits; and
output the groups of other blocks to the plurality of different regions of the memory for storage; and
a content renderer to retrieve the plaintext blocks from the first region of the memory and render the plaintext blocks, exclusive of the groups of other blocks.

2. A method comprising:
providing a memory having a plurality of regions;
receiving a plurality of ciphertext blocks of the multimedia content by a digital rights management engine to protect the provisioning and consumption of multimedia content associated with a license the digital rights management engine being a trusted and distinct element from the memory;
decrypting, by the digital rights management engine, the ciphertext blocks yielding a plurality of plaintext blocks;
outputting, by the digital rights management engine, the plaintext blocks to a first region of the memory;
providing, by the digital rights management engine, a plurality of groups of other blocks in addition to the plaintext cipher blocks for scattering to a plurality of different regions of the memory for storage while the ciphertext blocks of the multimedia content are being decrypted to provide protection against a plaintext injection attack, the plurality of different regions of the memory being distinct from the first region of the memory, each of the groups of other blocks having a predetermined pattern including at least three blocks, wherein at least two of the at least three blocks consist of the same data and wherein a size of each of the ciphertext, plaintext and other blocks is between 56 and 256 bits;
outputting, by the digital rights management engine, the groups of other blocks to the plurality of different regions of the memory for storage;
retrieving, by a content renderer, the plaintext blocks from the first region of the memory; and
rendering, by the content renderer, the plaintext blocks, exclusive of the groups of other blocks.

\* \* \* \* \*